(12) United States Patent
Harasawa et al.

(10) Patent No.: US 12,319,212 B2
(45) Date of Patent: Jun. 3, 2025

(54) BATTERY FIXING STRUCTURE

(71) Applicant: ISUZU MOTORS LIMITED, Tokyo (JP)

(72) Inventors: Tetsuya Harasawa, Fujisawa (JP); Toshihiro Usui, Fujisawa (JP); Tetsuo Inoue, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 354 days.

(21) Appl. No.: 18/112,293

(22) Filed: Feb. 21, 2023

(65) Prior Publication Data

US 2023/0294624 A1    Sep. 21, 2023

(30) Foreign Application Priority Data

Mar. 15, 2022  (JP) .................................. 2022-039869

(51) Int. Cl.
*H01M 50/249*    (2021.01)
*B60R 16/04*    (2006.01)

(52) U.S. Cl.
CPC ........... *B60R 16/04* (2013.01); *H01M 50/249* (2021.01)

(58) Field of Classification Search
CPC ............................. H01M 50/249; B60R 16/04
See application file for complete search history.

(56) References Cited

U.S. PATENT DOCUMENTS

| | | | | |
|---|---|---|---|---|
| 4,013,300 A * | 3/1977 | Berger | ................. | B60K 15/063 180/68.5 |
| 4,754,827 A * | 7/1988 | Hirabayashi | ............ | B60R 16/04 180/68.5 |
| 7,398,849 B2 * | 7/2008 | Yoshida | .................. | B60L 50/60 180/68.5 |
| 8,122,989 B2 * | 2/2012 | Burchett | ................. | B60R 16/04 180/68.5 |
| 8,372,530 B2 * | 2/2013 | Kubota | .................. | H01M 50/24 429/185 |
| 8,517,131 B2 * | 8/2013 | Kovach | ............... | H01M 50/249 180/68.5 |
| 8,596,682 B2 * | 12/2013 | Johnson | .................. | B60R 11/06 280/834 |
| 8,927,128 B2 * | 1/2015 | Kuroda | ............... | H01M 50/209 429/82 |
| 8,950,536 B2 * | 2/2015 | Maguire | .................. | B60K 1/04 180/68.5 |
| 9,276,243 B2 * | 3/2016 | Templeman | ........ | H01M 50/249 |

(Continued)

FOREIGN PATENT DOCUMENTS

EP            238383 A1      9/1987
JP        S37-007721 U     12/1935

(Continued)

*Primary Examiner* — Erez Gurari
(74) *Attorney, Agent, or Firm* — PROCOPIO, CORY, HARGREAVES & SAVITCH LLP

(57) ABSTRACT

A vehicle includes: a pair of coupling brackets which face side surfaces of the battery and are fixed to inner wall surfaces of the pair of side frames, a support bracket which is coupled to inclined portions of the coupling brackets by fastening members, pin members which protrude from the inclined portions, a positioning hole with which the pin members are positioned, and a guide hole that communicates with the positioning hole and has a larger diameter than the positioning hole.

10 Claims, 5 Drawing Sheets

(56) References Cited

U.S. PATENT DOCUMENTS

| | | | | |
|---|---|---|---|---|
| 9,484,562 | B2* | 11/2016 | Utley | H01M 50/209 |
| 10,086,880 | B2* | 10/2018 | Son | H01M 50/249 |
| 10,305,151 | B2* | 5/2019 | Hitz | B60R 16/04 |
| 10,391,881 | B2* | 8/2019 | Kim | H01M 10/613 |
| 10,919,398 | B2* | 2/2021 | Higaki | B60L 50/66 |
| 11,040,610 | B2* | 6/2021 | Sloan | B60K 1/04 |
| 12,172,509 | B2* | 12/2024 | Lang | H01M 50/242 |
| 12,220,979 | B2* | 2/2025 | Okonogi | H01M 50/204 |
| 2022/0416348 | A1* | 12/2022 | Hihara | H01M 50/249 |
| 2023/0299410 | A1* | 9/2023 | Sugawara | H01M 50/262 |
| | | | | 296/203.03 |

FOREIGN PATENT DOCUMENTS

| | | |
|---|---|---|
| JP | S57-045453 U | 8/1955 |
| JP | H02-121461 U | 10/1990 |
| JP | H04-129343 A | 4/1992 |
| JP | H08-324453 A | 12/1996 |
| JP | 2017-065381 A | 4/2017 |
| JP | 2018-103765 A | 7/2018 |

* cited by examiner

BATTERY FIXING STRUCTURE

CROSS-REFERENCE TO RELATED APPLICATIONS

The present application claims priority to Japanese Patent Applications number 2022-39869, filed on Mar. 15, 2022 contents of which are incorporated herein by reference in their entirety.

BACKGROUND OF THE INVENTION

The present disclosure relates to a battery fixing structure that fixes a battery to a vehicle body frame. In a vehicle having a frame structure such as a truck, a battery is fixed to a side frame or the like via a bracket.

In view of workability in fixing a battery, there has been proposed a system in which one bracket among a plurality of brackets is fixed to a side frame, and the other bracket is coupled to the one bracket with a fastening member while supporting the battery. In this case, the battery may fall off if the fastening member coupling these two brackets is loosened.

The present disclosure focuses on this point, and its object is to prevent a battery from falling off due to looseness of a fastening member.

An aspect of the present disclosure provides a battery fixing structure for fixing a battery between a pair of side frames of a vehicle body, the battery fixing structure including: a pair of first brackets facing side surfaces of the battery and fixed to an inner wall surface of each of the pair of side frames; a second bracket which supports a bottom surface of the battery and is coupled, by a fastening member, to an inclined portion inclined with respect to a vertical direction of the pair of first brackets; a pin member protruding from the inclined portion of one of the first brackets; a positioning hole provided in the second bracket and in which the pin member is positioned; and a guide hole that communicates with the positioning hole in the second bracket and has a larger diameter than the positioning hole.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.
<Fixing Structure for a Battery>

A battery fixing structure according to an embodiment of the present disclosure will be described by referring to FIGS. 1 to 3.

Figure 1:
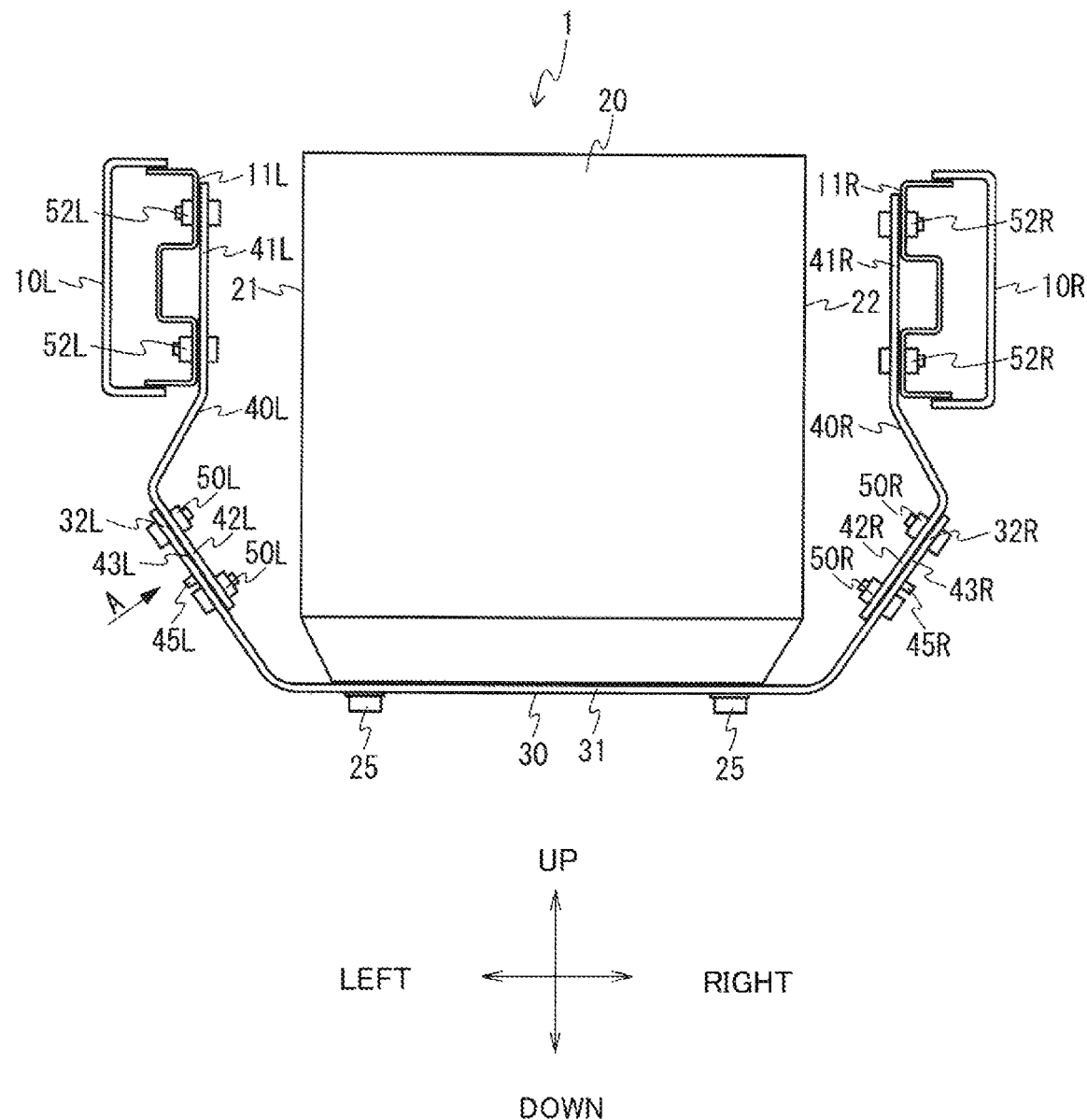
FIG. 1 is a schematic diagram for illustrating a vehicle 1 having a fixing structure for a battery 20 according to an embodiment.

FIG. 1 is a schematic diagram for illustrating a vehicle 1 having a fixing structure for a battery 20 according to the embodiment. FIG. 2 is an enlarged schematic diagram showing a portion viewed in a direction of an arrow A shown in FIG. 1. FIG. 3 is a schematic diagram showing a state in which the battery 20 is mounted in an inverted state.

As shown in FIG. 1, the vehicle 1 includes a pair of side frames 10L and 10R, the battery 20, a support bracket 30, and a pair of coupling brackets 40L and 40R. In the present embodiment, the coupling brackets 40L and 40R correspond to a pair of first brackets, and the support bracket 30 corresponds to a second bracket.

The pair of side frames 10L and 10R are provided along a front-rear direction of the vehicle 1. That is, the longitudinal direction of the side frames 10L and 10R is along the front-rear direction. Here, the side frames 10L and 10R each have a closed cross section.

The battery 20 is a high-voltage storage battery mounted on the vehicle 1, which is an electric vehicle. As shown in FIG. 1, the battery 20 is disposed between the pair of side frames 10L and 10R. A side surface 21 of the battery 20 faces the side frame 10L, and a side surface 22 faces the side frame 10R. The battery 20 is fixed to the side frames 10L and 10R via the support bracket 30 and coupling brackets 40L and 40R. When the battery 20 is mounted, the battery 20 is fixed to the side frames 10L and 10R in an inverted state, as shown in FIG. 3.

As shown in FIG. 1, a pair of coupling brackets 40L and 40R are disposed symmetrically on respective sides of the battery 20 along the vertical direction. The coupling bracket 40L is opposed to the side surface 21 of the battery 20, and the coupling bracket 40R is opposed to the side surface 22 of the battery 20. An upper end of the coupling bracket 40L is fixed to an inner wall surface 11L of the side frame 10L by a fastening member 52L, and an upper end of the coupling bracket 40R is fixed to an inner wall surface 11R of the side frame 10R by a fastening member 52R. The inner wall surfaces 11L and 11R are inner surfaces of the pair of side frames 10L and 10R in a vehicle width direction. Further, a lower end of the coupling bracket 40L is fixed to a bent portion 32L of the support bracket 30 by the fastening member 50L, and a lower end of the coupling bracket 40R is fixed to the bent portion 32R of the support bracket 30 by the fastening member 50R.

The coupling bracket 40L includes a fixing portion 41L, an inclined portion 42L, and a pin member 45L. As shown in FIG. 1, the fixing portion 41L is coupled to the inner wall surface 11L of the side frame 10L. Specifically, the fixing portion 41L is fixed to the inner wall surface 11L by a plurality of fastening members 52L. The fixing portion 41L is positioned along the vertical direction.

As shown in FIG. 1, the inclined portion 42L is a distal end of a portion extending in an approximate L-shape from the fixing portion 41L. The inclined portion 42L is formed to be inclined with respect to the vertical direction. The inclined portion 42L has an inclined surface 43L inclined such that the distal end thereof faces the center in the vehicle width direction.

Figure 3:
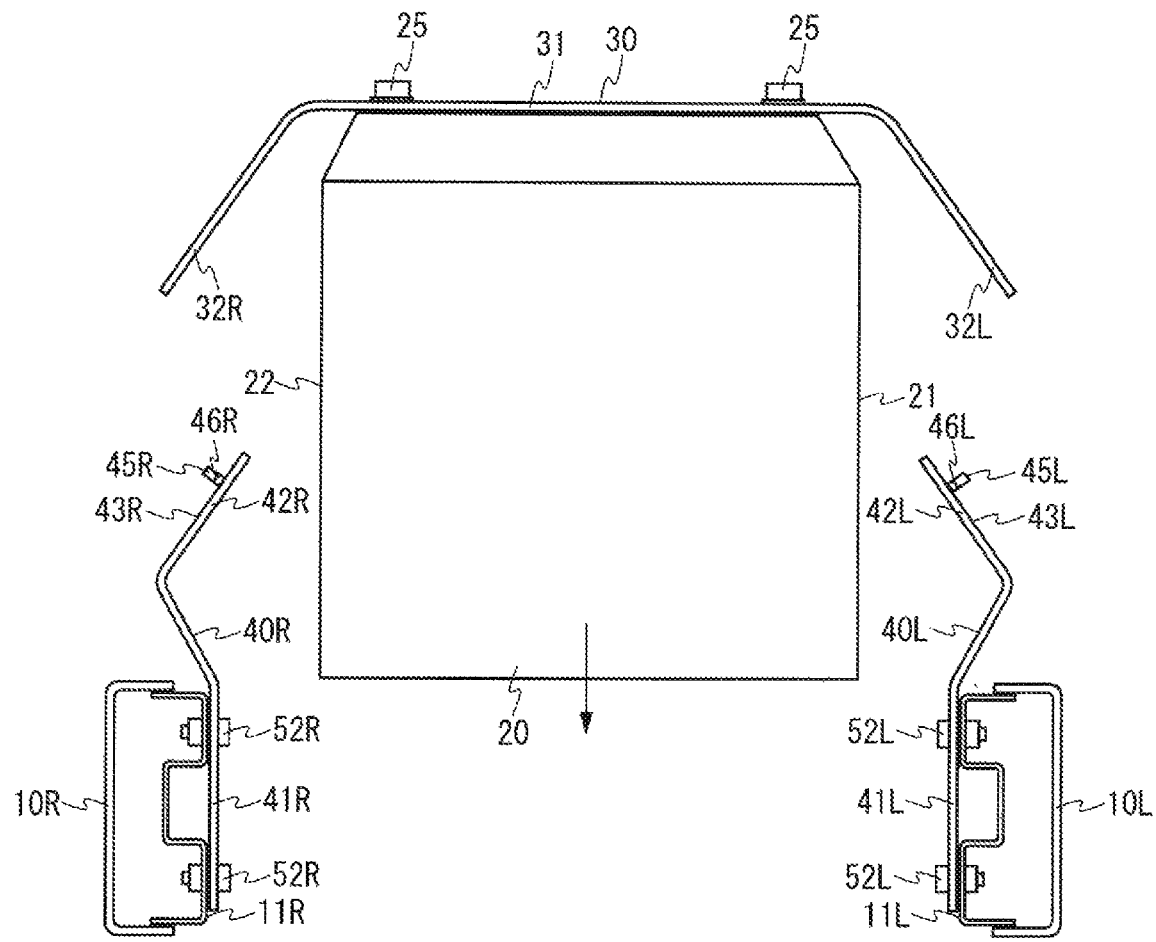
FIG. 3 is a schematic diagram showing a state in which the battery 20 is mounted in an inverted state.

As shown in FIG. 3, the pin member 45L is provided such that it protrudes from the inclined portion 42L. Specifically, the pin member 45L protrudes in the normal direction of the inclined surface 43L of the inclined portion 42L. A groove 46L (see FIG. 3) along the circumferential direction is formed on an outer peripheral surface of the pin member 45L. The width of the groove 46L is greater than the thickness of the support bracket 30, for example.

The coupling bracket 40R includes a fixing portion 41R, an inclined portion 42R, and a pin member 45R. As shown in FIG. 1, the fixing portion 41R is coupled to the inner wall surface 11R of the side frame 10R. Specifically, the fixing portion 41R is fixed to the inner wall surface 11R by a plurality of fastening members 52R. The fixing portion 41R is positioned along the vertical direction.

As shown in FIG. 1, the inclined portion 42R is a distal end of a portion extending in an approximate L-shape from the fixing portion 41R. The inclined portion 42R is formed to be inclined with respect to the vertical direction. The inclined portion 42R has an inclined surface 43R inclined such that the distal end thereof faces the center in the vehicle width direction.

As shown in FIG. 3, the pin member 45R is provided such that it protrudes from the inclined portion 42R. Specifically, the pin member 45R protrudes in the normal direction of the inclined surface 43R of the inclined portion 42R. A groove 46R (see FIG. 3) along the circumferential direction is formed on an outer circumferential surface of the pin member 45R. The width of the groove 46R is greater than the thickness of the support bracket 30, for example.

The support bracket 30 supports the battery 20. The support bracket 30 is coupled to the inclined portion 42L of the coupling bracket 40L by the plurality of fastening members 50L, and is coupled to the inclined portion 42R of the coupling bracket 40R by the plurality of fastening members 50R. The support bracket 30 includes a support portion 31 and the bent portions 32L and 32R, as show in FIG. 1.

The support portion 31 is a central portion of the support bracket 30. The support portion 31 supports a bottom surface of the battery 20. The support portion 31 is fixed to the bottom surface of the battery 20 by a plurality of fastening members 25.

The bent portion 32L is a portion bent from the left end of the support portion 31. The bent portion 32L is in contact with the inclined surface 43L of the inclined portion 42L. The bent portion 32L is coupled to the inclined portion 42L of the coupling bracket 40L. Specifically, the bent portion 32L is fixed to the inclined portion 42L by the plurality of fastening members 50L arranged at predetermined intervals, as shown in FIG. 2.

The bent portion 32L has a plurality of through holes 38 (see FIGS. 4A and 4B) through which bolts of the plurality of fastening members 50L are inserted. The bent portion 32L is in contact with the inclined portion 42L from which the pin member 45L protrudes. The bent portion 32L has a hole portion 34 (FIG. 2) through which the pin member 45L of the coupling bracket 40L is inserted and positioned. The hole portion 34 is positioned at the center of the plurality of through holes 38.

Figure 2:
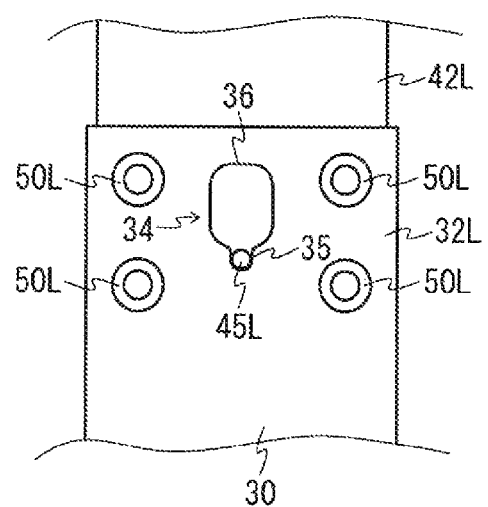
FIG. 2 is an enlarged schematic diagram showing a portion viewed in a direction of an arrow A shown in FIG. 1.

The hole portion 34 includes a positioning hole 35 and a guide hole 36, as shown in FIG. 2. The positioning hole 35 and the guide hole 36 are positioned between the plurality of fastening members 50L. The hole portion 34 has a so-called key-hole shape in which the positioning hole 35 and the guide hole 36 communicate with each other. The guide hole 36 is positioned above the positioning hole 35 in the vertical direction.

The positioning hole 35 is a hole by which the pin member 45 is positioned, as shown in FIG. 2. A diameter of the positioning hole 35 is approximately the same as a diameter of the pin member 45L.

The guide hole 36 functions as a guide for inserting the pin member 45L into the hole portion 34 when the battery 20 is mounted. A diameter of the guide hole 36 is larger than the diameter of the positioning hole 35. The guide hole 36 is an elongated hole whose longitudinal direction extends in the vertical direction. This facilitates insertion of the pin member 45L through the guide hole 36.

Similarly to the bent portion 32L, the bent portion 32R also has a hole portion 34 having the positioning hole 35 and the guide hole 36. Since the hole portion 34 of the bent portion 32R has the same configuration as the hole portion 34 of the bent portion 32L described above, detailed description thereof will be omitted.

Figure 4A:
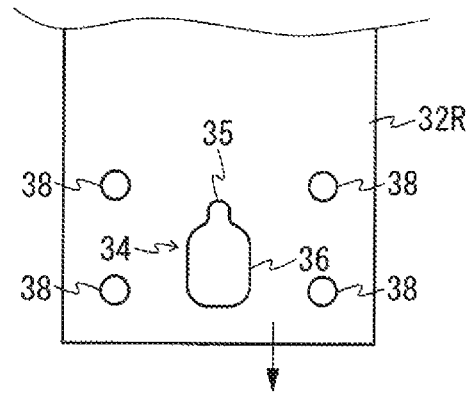
FIGS. 4A and 4B are each a schematic diagram for illustrating a state in which a pin member 45R is inserted through a guide hole 36.
Figure 4B:
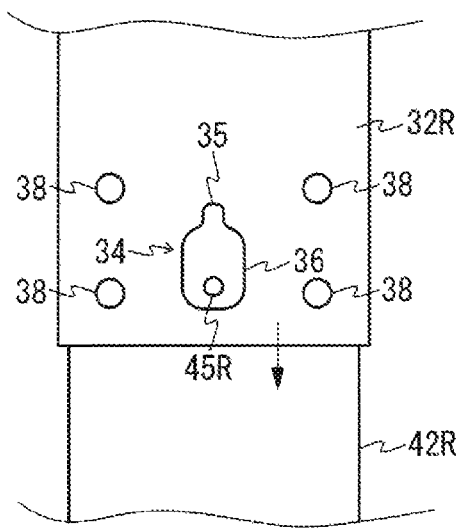

A flow of mounting the battery 20 on the vehicle 1 will be described below with reference to FIGS. 3, 4A, and 4B. FIGS. 4A and 4B are each a schematic diagram for illustrating a state in which the pin member 45R is inserted through the guide hole 36. First, the side frames 10L and 10R are inverted. Next, the coupling brackets 40L and 40R are fixed to the side frames 10L and 10R. That is, the coupling bracket 40L is fixed to the side frame 10L by the fastening member 52L, and the coupling bracket 40R is fixed to the side frame 10R by the fastening member 52R. The present disclosure is not limited to the above, and the side frames 10L and 10R may be inverted after the coupling brackets 40L and 40R are first fixed to the side frames 10L and 10R.

Next, the battery 20 to which the support bracket 30 is fixed by the fastening members 25 is lowered, in an inverted state, from above the side frames 10L and 10R, as shown in FIG. 3. Then, the bent portions 32L and 32R of the support bracket 30 approach the coupling brackets 40L and 40R (see FIG. 4A).

Thereafter, the pin members 45L and 45R are inserted through the guide holes 36 of the bent portions 32L and 32R of the support bracket 30. For example, the pin member 45R is inserted through the guide hole 36 of the bent portion 32R, as shown in FIG. 4B. Since the diameter of the guide hole 36 is sufficiently larger than the diameter of the pin member 45R, the pin member 45R can be easily inserted through the guide hole 36 even with positional deviation between the pin member 45R and the guide hole 36.

When the battery 20 is further lowered, the pin members 45L and 45R are each positioned by engaging with a respective positioning hole 35 that communicates with a guide hole 36. In this manner, when the battery 20 is fixed to the side frames 10L and 10R in the inverted state, the pin members 45L and 45R are each positioned by a positioning hole 35 after being inserted into a guide hole 36. The support bracket 30 and the coupling brackets 40L and 40R are fixed by fastening the fastening members 50L and 50R in a state where the pin members 45L and 45R are each positioned in a positioning hole 35. Thereafter, an operation of mounting the battery 20 is completed by returning the battery 20 to a non-inverted state, which is a state of being used, to be fixed to the side frames 10L and 10R.

Figure 5:
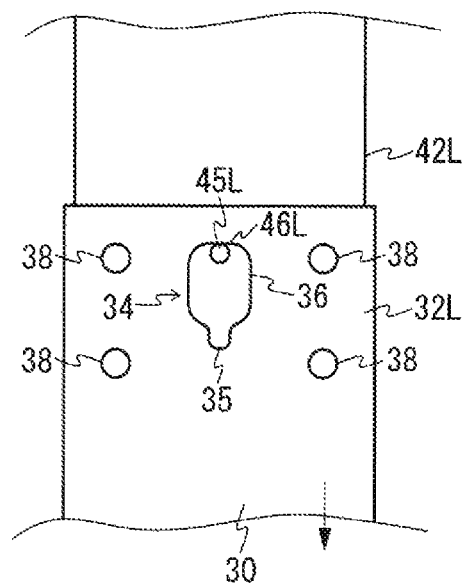
FIG. 5 is a schematic diagram for illustrating a state in which a pin member 45L is engaged with the guide hole 36.

In a state where the fastening of the fastening members 50L and 50R, which fix the coupling brackets 40L and 40R and the support bracket 30, is insufficient, the fastening members 50L and 50R may be loosened and come off. On the other hand, in the present embodiment, since the guide holes 36 communicate with the positioning holes 35 in an upward direction, even if either of the fastening members 50L and 50R comes off, the pin members 45L and 45R are engaged with the guide holes 36, thereby preventing the battery 20 from falling off FIG. 5 is a schematic diagram for illustrating a state in which the pin member 45L is engaged with the guide hole 36. Here, it is assumed that a plurality of fastening members 50L that fix the coupling bracket 40L and the support bracket 30 shown in FIG. 2 are loosened and came off. In such a case, the bent portion 32L of the support bracket 30 moves downward with respect to the coupling bracket 40L. With this movement of the bent portion 32L, the hole portion 34 also moves downward with respect to the pin member 45L, and the pin member 45L is hooked on the upper end of the guide hole 36, as shown in FIG. 5. Specifically, the groove formed on the outer peripheral surface of the pin member 45L is hooked on the upper end of the guide hole 36. That is, the groove of the pin member 45 is formed at a position where it can be engaged with the edge of the guide hole 36. This prevents the bent portion 32L from moving downward and prevents the battery 20 from falling off.

In the above description, cases where the fastening member 50L came off have been described. In a case where the fastening member 50R comes off, the downward movement of the bent portion 32R can be restricted due to the pin member 45R hooking on the guide hole 36 of the bent portion 32R, and therefore the falling off of the battery 20 can be prevented.

Effect of the Present Embodiment

The vehicle 1 of the embodiment described above includes the pair of coupling brackets 40L and 40R fixed to the side surface of the side frame 10R and the side surface of the side frame 10L, and a support bracket 30 supporting the battery 20 and fixed to (i) the inclined portion 42L of the coupling bracket 40L by the fastening member 50L and (ii) the inclined portion 42R of the coupling bracket 40R by the fastening member 50R. The coupling bracket 40L has the pin member 45L protruding from the inclined portion 42L, and the coupling bracket 40R has the pin member 45R protruding from the inclined portion 42R. Also, the support bracket 30 includes the positioning holes 35 with which the pin members 45L and 45R are positioned, and the guide holes 36 which communicate with the positioning holes 35. The guide hole 36 has a larger diameter than the positioning hole 35. In this way, when the battery 20 is mounted in the inverted state, the pin members 45L and 45R are inserted into the guide holes 36 and then positioned by the positioning holes 35, whereby the battery 20 can be easily positioned at a desired position. On the other hand, when one of the fastening members 50L and 50R (here, the fastening member 50L) is loosened and comes off, the pin member 45L is hooked on the upper end of the guide hole 36 when the support bracket 30 moves downward with respect to the coupling bracket 40L, thereby preventing the battery 20 from falling off The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present disclosure is obvious from the description of the claims.

What is claimed is:

1. A battery fixing structure for fixing a battery between a pair of side frames of a vehicle body, the battery fixing structure comprising:

a pair of first brackets facing side surfaces of the battery and fixed to an inner wall surface of each of the pair of side frames;

a second bracket which supports a bottom surface of the battery and is coupled, by a fastening member, to an inclined portion inclined with respect to a vertical direction of the pair of first brackets;

a pin member protruding from the inclined portion of the first brackets;

a positioning hole provided in the second bracket and in which the pin member is positioned; and a guide hole that communicates with the positioning hole in the second bracket and has a larger diameter than the positioning hole.

2. The battery fixing structure according to claim 1, wherein the guide hole is an elongated hole whose longitudinal direction extends along the vertical direction.

3. The battery fixing structure according to claim 1, wherein
the inclined portion includes an inclined surface inclined such that a distal end of the first
brackets faces the center in a vehicle width direction of the vehicle body, and the pin member protrudes in the normal direction of the inclined surface.

4. The battery fixing structure according to claim 1, wherein
the second bracket is coupled to the inclined portion by a plurality of fastening members arranged at predetermined intervals, and
the positioning hole and the guide hole are positioned between the plurality of fastening members.

5. The battery fixing structure according to claim 1, wherein
an outer circumferential surface of the pin member includes a groove along the circumferential direction, and
a width of the groove is greater than a thickness of the second bracket.

6. The battery fixing structure according to claim 1, wherein
an outer circumferential surface of the pin member includes a groove along the circumferential direction, and
the groove is formed at a position where the groove of the pin can be engaged with an edge of the guide hole.

7. The battery fixing structure according to claim 1, wherein
the second bracket includes:
a support portion that supports the bottom surface of the battery; and
a bent portion bent from an end portion of the support portion and coupled to the inclined portion.

8. The battery fixing structure according to claim 7, wherein
the bent portion is in contact with an inclined surface of the inclined portion, and
the pin member protrudes in the normal direction from the inclined surface.

9. The battery fixing structure according to claim 1, wherein the guide hole is positioned above the positioning hole in the vertical direction.

10. The battery fixing structure according to claim 1, wherein the pin member is positioned by the positioning hole after being inserted into the guide hole when the battery is fixed to the side frames in an inverted state.

* * * * *